United States Patent
Saito (10) Patent No.: US 11,835,115 B1
(45) Date of Patent: Dec. 5, 2023

(54) TELESCOPIC APPARATUS

(71) Applicant: CORETECH Co., Ltd., Yokohama (JP)

(72) Inventor: Hiromichi Saito, Yokohama (JP)

(73) Assignee: CORETECH Co., Ltd, Yokohama (JP)

( * ) Notice: Subject to any disclaimer, the term of this patent is extended or adjusted under 35 U.S.C. 154(b) by 0 days.

(21) Appl. No.: 18/073,027

(22) Filed: Dec. 1, 2022

(51) Int. Cl.
F16H 25/20 (2006.01)

(52) U.S. Cl.
CPC ......... *F16H 25/20* (2013.01); *F16H 25/2056* (2013.01); *F16H 2025/2062* (2013.01)

(58) Field of Classification Search
CPC ................. F16H 25/20; F16H 20/2056; F16H 2025/2062
USPC ........................................................ 74/89.34
See application file for complete search history.

(56) References Cited

U.S. PATENT DOCUMENTS

| | | | |
|---|---|---|---|
| 4,337,868 A | 7/1982 | Gattu | |
| 4,500,805 A * | 2/1985 | Swanson | H02K 7/06 310/83 |
| 5,937,699 A | 8/1999 | Garrec | |
| 2002/0104395 A1* | 8/2002 | Zimmerman | A47B 9/04 74/89.35 |
| 2002/0162410 A1* | 11/2002 | Zimmerman | F16H 25/20 74/89.35 |
| 2007/0295126 A1* | 12/2007 | Wang | F16H 25/20 74/89.35 |
| 2008/0028878 A1* | 2/2008 | Wang | F16H 25/20 74/89.35 |
| 2011/0120243 A1* | 5/2011 | Pettersson | F16M 11/04 74/89.28 |
| 2015/0075306 A1* | 3/2015 | Castelli | F16H 25/2454 74/89.35 |
| 2017/0175859 A1* | 6/2017 | Brockmeier | F16H 25/2056 |
| 2018/0140087 A1* | 5/2018 | Wu | F16H 25/2056 |
| 2018/0172062 A1* | 6/2018 | Hu | F16H 25/2056 |
| 2019/0060578 A1* | 2/2019 | Farris | A61M 5/31511 |
| 2019/0390752 A1* | 12/2019 | Tsai | F16H 25/2015 |
| 2021/0129359 A1* | 5/2021 | Matsumoto | B25J 18/025 |

(Continued)

FOREIGN PATENT DOCUMENTS

| | | |
|---|---|---|
| JP | S56-132293 A | 10/1981 |
| JP | H09-077476 A | 3/1997 |

(Continued)

*Primary Examiner* — Ha Dinh Ho
(74) *Attorney, Agent, or Firm* — WHDA, LLP (57) ABSTRACT

A telescopic apparatus is provided which can cause three or more cylindrical members to extend and contract smoothly without use of pneumatic pressure and hydraulic pressure. A telescopic apparatus includes: a first to a third cylindrical member that are nested; screw shafts supported rotatably and respectively by the first and second cylindrical members; nuts mounted respectively on the second and third cylindrical members to be threadedly engaged with the screw shafts of the first and second cylindrical members; and a transmission configured to transmit the rotation of the screw shaft of the first cylindrical member to the screw shaft of the second cylindrical member and to be movable in an axial direction relative to the screw shaft of the first cylindrical member. The screw shafts of the first and second cylindrical members rotate at one time to cause the first to the third cylindrical member to extend and contract.

7 Claims, 11 Drawing Sheets

(56) References Cited

U.S. PATENT DOCUMENTS

2021/0321760 A1* 10/2021 Windhaber ......... F16H 25/2056
2022/0088498 A1* 3/2022 Shilo .................... A63H 33/009
2022/0274814 A1* 9/2022 Li ........................... F16H 25/20

FOREIGN PATENT DOCUMENTS

| JP | H09-156889 A | 6/1997 | | |
|----|----|----|----|----|
| JP | H10-277985 A | 10/1998 | | |
| JP | 2000-046140 A | 2/2000 | | |
| JP | 2001-200550 A | 7/2001 | | |
| JP | 2001205582 A | * | 7/2001 | ............ B25J 18/025 |
| JP | 2022-064290 A | 4/2022 | | |

* cited by examiner

TELESCOPIC APPARATUS

Japanese Patent Application Publication No. 2022-064290A was published on Apr. 25, 2022. The inventor of the Japanese Patent Application Publication No. 2022-064290A is Hiromichi Saito who is the inventor of the present application. The applicant, CORETECH Co. Ltd., of the Japanese Patent Application Publication No. 2022-064290A is an assignee who obtained the invention of the Japanese Patent Application Publication from the present inventor. A copy of the Japanese Patent Application Publication is provided on a concurrently filed Information Disclosure Statement pursuant to the guidance of 78 Fed. Reg. 11076 (Feb. 14, 2013).

BACKGROUND

Technical Field

The present invention relates to a telescopic apparatus that includes three or more nested cylindrical members and causes the three or more cylindrical members to extend and contract.

Related Art

As this type of telescopic apparatus, a telescopic apparatus in which a first to a third cylindrical member are nested is known (refer to JP H9-156889 A). Pneumatic pressure or hydraulic pressure is supplied into the first to the third cylindrical member. The outermost first cylindrical member is secured to a base. An object is placed on the innermost third cylindrical member. When pneumatic pressure or hydraulic pressure is supplied into the first to the third cylindrical member, the first to the third cylindrical member extend. On the other hand, when the pneumatic pressure or hydraulic pressure is released from the insides of the first to the third cylindrical member, the first to the third cylindrical member contract. Hence, the object placed on the third cylindrical member can be raised and lowered.

However, the known telescopic apparatus that uses pneumatic pressure or hydraulic pressure requires a seal, a pump, or a tank to seal the pneumatic pressure or hydraulic pressure; therefore, there is a problem that the structure of the known telescopic apparatus is complicated. Moreover, the known telescopic apparatus is of a type that, on the one hand, extends upward from the ground by use of pneumatic pressure or hydraulic pressure and, on the other hand, is lowered by gravitation. Hence, there is a problem that the telescopic apparatus cannot contract when the telescopic apparatus is placed horizontally or upside down.

The present invention has been made, considering the above problem, and an object thereof is to provide a telescopic apparatus where three or more cylindrical members can extend and contract without use of pneumatic pressure and hydraulic pressure.

SUMMARY

In order to solve the above problem, one aspect of the present invention is a telescopic apparatus including: a first, second and third cylindrical member that are nested; a first screw shafts supported rotatably by the first cylindrical member; a second screw shaft supported rotatably by the second cylindrical member: a first nut mounted on the second cylindrical member to be threadedly engaged with the first screw shafts; a second nut mounted on the third cylindrical member to be threadedly engaged with the second screw shaft: a motor configured to rotationally drive the first screw shaft: and a first transmission configured to transmit the rotation of the first screw shaft to the second screw shaft and to be movable in an axial direction relative to the first screw shaft, in which the first and second screw shafts rotate at one time to cause the first, second and third cylindrical member to extend and contract, a helical groove is formed in an outer surface of the first screw shaft, and an axial groove intersecting the groove is formed in the outer surface of the first screw shaft, a driver of the first transmission is provided with a key, a spline nut, or a ball spline nut that fits in the axial groove, and at least part of the first screw shaft and at least part of the second screw shaft are inside the first, second and third cylindrical member in a contracted state of the telescopic apparatus, and the motor is outside the first, second and third cylindrical member.

According to the one aspect of the present invention, the first and second feed screws (each of the feed screws includes a screw shaft and a nut) and the first transmission that can move in the axial direction are used to cause the first to the third cylindrical member to extend and contract; therefore, it is possible to cause the first to the third cylindrical member to extend and contract without use of pneumatic pressure and hydraulic pressure.

DETAILED DESCRIPTION

A detailed description will hereinafter be given of embodiments of a telescopic apparatus of the present invention with consultation of drawings. However, the telescopic apparatus of the present invention can be embodied in various forms, and is not limited to the embodiments described in the description. The embodiments are provided with the intention of enabling those skilled in the art to fully understand the scope of the invention by fully disclosing the description.

First Embodiment

Figures 1A, 1B, 1C:
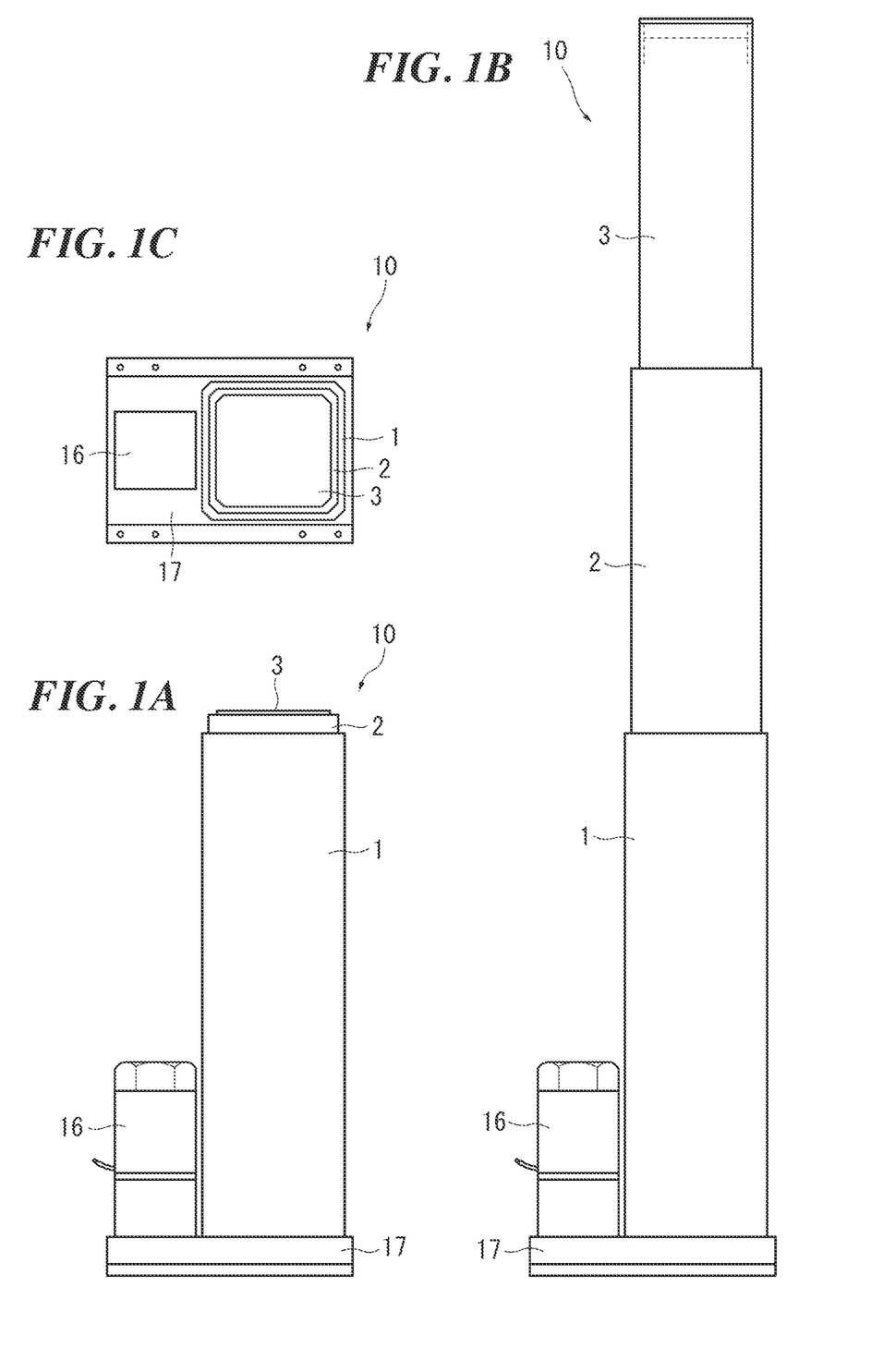
FIG. 1A is a diagram illustrating the external appearance of a telescopic apparatus (a contracted state) of a first embodiment of the present invention.
FIG. 1B is a diagram illustrating the external appearance of the telescopic apparatus (an extended state) of the embodiment.
FIG. 1C is a plan view of the telescopic apparatus of the embodiment.

FIGS. 1A to 1C illustrate the external appearance of a telescopic apparatus 10 of a first embodiment of the present invention. The telescopic apparatus 10 of the embodiment is the three-stage telescopic apparatus 10. FIG. 1A illustrates a contracted state of the telescopic apparatus 10, and FIG. 1B illustrates an extended state. FIG. 1C is a plan view of the telescopic apparatus 10.

The telescopic apparatus 10 includes a first to a third cylindrical member (hereinafter referred to as the first to the third pole 1 to 3) that are nested. The second pole 2 fits inside the first pole 1. The third pole 3 fits inside the second pole 2. Each of the first to the third pole 1 to 3 has an approximately square shape in cross section. The lower end of the first pole 1 is secured to a base 17. An unillustrated object is placed on the upper end of the third pole 3. A motor 16 is a driving source. When the motor 16 is rotationally driven, the first to the third pole 1 to 3 extend and contract. Instead of the motor 16, an unillustrated manual handle may cause the first to the third pole 1 to 3 to extend and contract.

Figure 2:
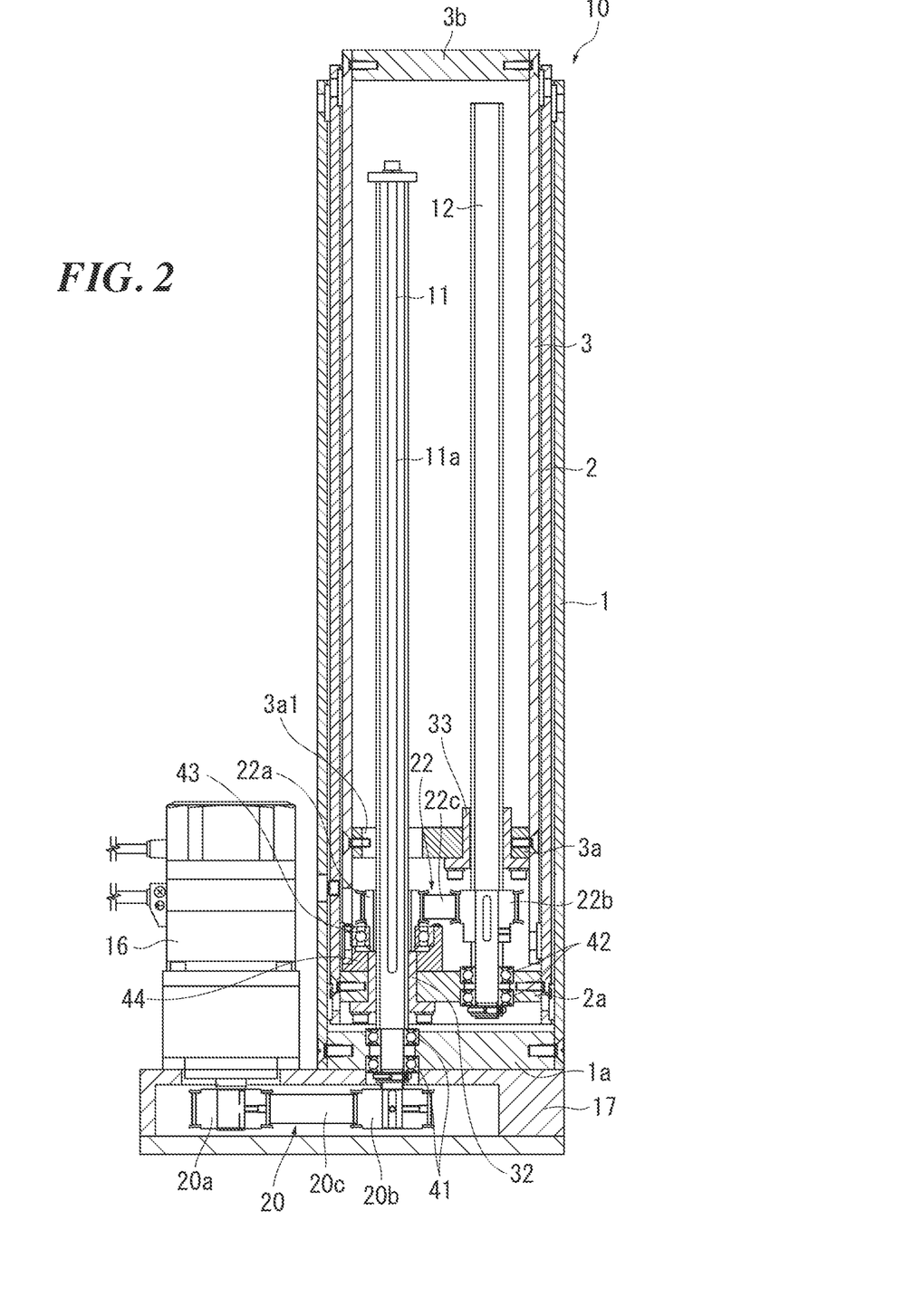
FIG. 2 is a vertical cross-sectional view of the telescopic apparatus (the contracted state) of the embodiment.
Figure 3:
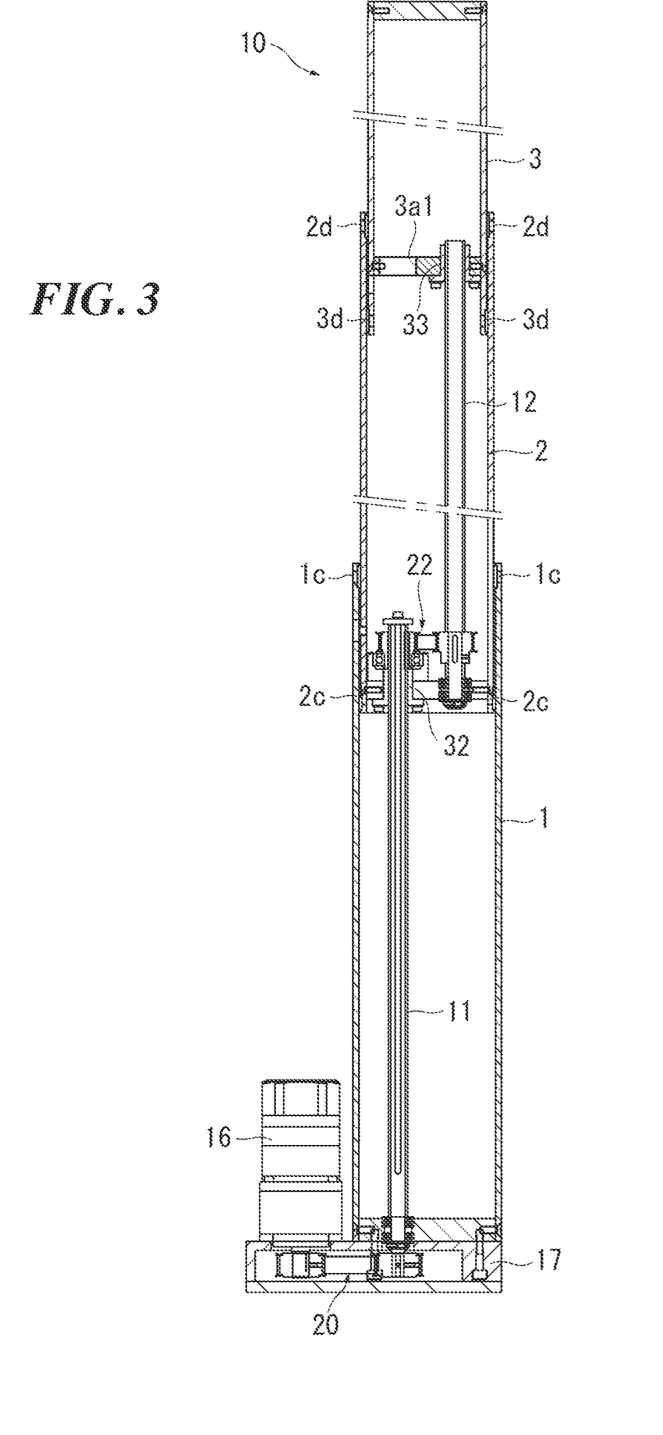
FIG. 3 is a vertical cross-sectional view of the telescopic apparatus (the extended state) of the embodiment.

FIGS. 2 and 3 are vertical cross-sectional views of the telescopic apparatus 10. FIG. 2 illustrates the contracted state. FIG. 3 illustrates the extended state. As illustrated in FIG. 2, the first pole 1 has a bottomed cylindrical shape. The first pole 1 is open at the upper end, and includes a bottom plate 1a at the lower end. The second pole 2 fits inside the first pole 1. The second pole 2 also has a bottomed cylindrical shape. The second pole 2 is open at the upper end, and includes a bottom plate 2a at the lower end. The third pole 3 fits inside the second pole 2. The third pole 3 has a covered and bottomed cylindrical shape. The third pole 3 includes an upper plate 3b at the upper end, and a bottom plate 3a at the lower end.

As illustrated in FIG. 3, the axial movement of the second pole 2 is guided by the first pole 1. The upper end of the first pole 1 is provided with a resin sliding piece 1c over which the outer surface of the second pole 2 slides. The lower end of the second pole 2 is provided with a resin sliding piece 2c that slides over the inner surface of the first pole 1. The axial movement of the third pole 3 is guided by the second pole 2. The upper end of the second pole 2 is provided with a resin sliding piece 2d over which the outer surface of the third pole 3 slides. The lower end of the third pole 3 is provided with a resin sliding piece 3d that slides over the inner surface of the second pole 2.

Again, as illustrated in FIG. 2, a first screw shaft 11 (hereinafter referred to as the screw shaft 11) is rotatably supported by the bottom plate 1a of the first pole 1 via a bearing 41. A helical groove and an axial groove 11a extending in the axial direction are formed in the outer surface of the screw shaft 11. The groove is, for example, a trapezoidal thread, or a groove for a ball screw. The axial groove 11a is a key groove or a spline groove.

The screw shaft 11 is rotationally driven by the motor 16. The rotation of the motor 16 is transmitted to the screw shaft 11 via a transmission 20. The transmission 20 includes, for example, a driver 20a (a pulley) that is secured to an output shaft of the motor 16, a follower 20b (a pulley) that is secured to the screw shaft 11, and a belt 20c that is looped over the driver 20a and the follower 20b. The transmission 20 is not limited to the above winding transmission, and may be, for example, a gear.

A first nut 32 (hereinafter referred to as the nut 32) that is threadedly engaged with the screw shaft 11 is mounted in the bottom plate 2a of the second pole 2. The nut 32 is, for example, a trapezoidal thread nut where a trapezoidal thread is formed. The nut 32 may be a ball screw nut. When the screw shaft 11 is rotated, the second pole 2 secured to the nut 32 moves in the axial direction.

A second screw shaft 12 (hereinafter referred to as the screw shaft 12) is rotatably supported by the bottom plate 2a of the second pole 2 via a bearing 42 at a position away from the nut 32. A helical groove is formed in the outer surface of the screw shaft 12. The groove is, for example, a trapezoidal thread, or a groove for a ball screw. An axial groove is not formed in the outer surface of the screw shaft 12.

The rotation of the screw shaft 11 of the first pole 1 is transmitted to the screw shaft 12 of the second pole 2 by a first transmission 22 (hereinafter referred to as the transmission 22). The transmission 22 includes a driver 22a (a pulley), a follower 22b (a pulley), and a belt 22c that is looped over the driver 22a and the follower 22b. The driver 22a can move in the axial direction relative to the screw shaft 11 of the first pole 1. The follower 22b is secured to the screw shaft 12 of the second pole 2. The transmission 22 is not limited to the above winding transmission, and may be, for example, a gear.

Figure 4A:
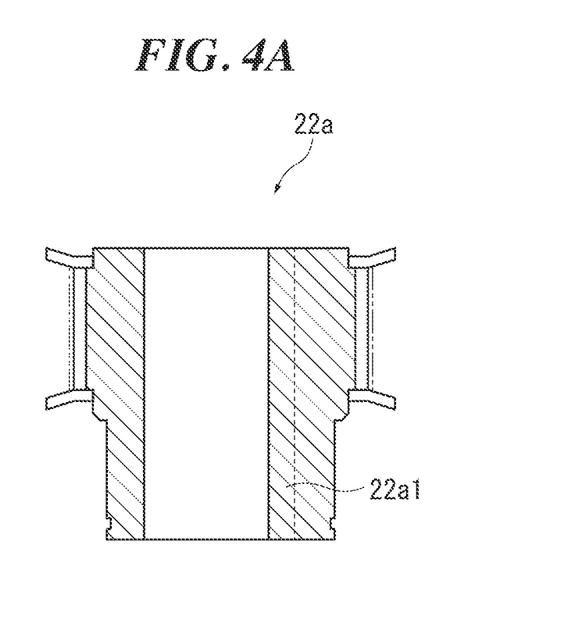
FIG. 4A is a vertical cross-sectional view of a driver of the telescopic apparatus of the embodiment.
Figure 4B:
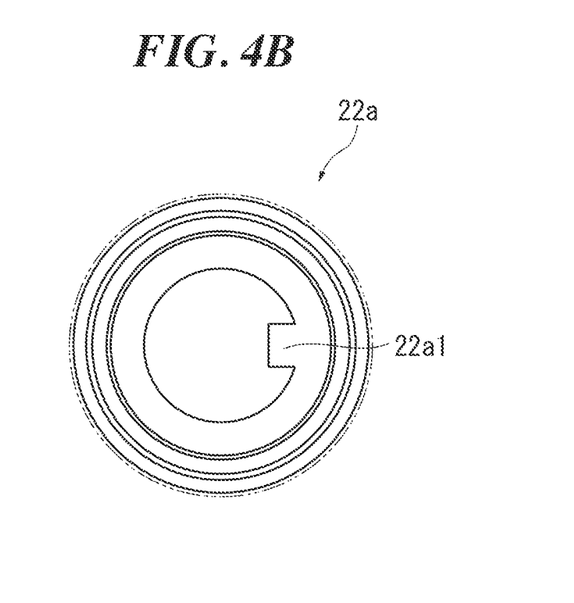
FIG. 4B is a bottom view of the driver of the telescopic apparatus of the embodiment.

FIGS. 4A and 4B illustrate the driver 22a. A key 22a1 that fits in the axial groove (key groove) 11a of the screw shaft 11 of the first pole 1 is formed on the driver 22a. The key 22a1 may be formed integrally with, or provided separately from, the driver 22a. Two or more keys 22a1 may be provided to increase the torque transmission capacity.

Figure 5:
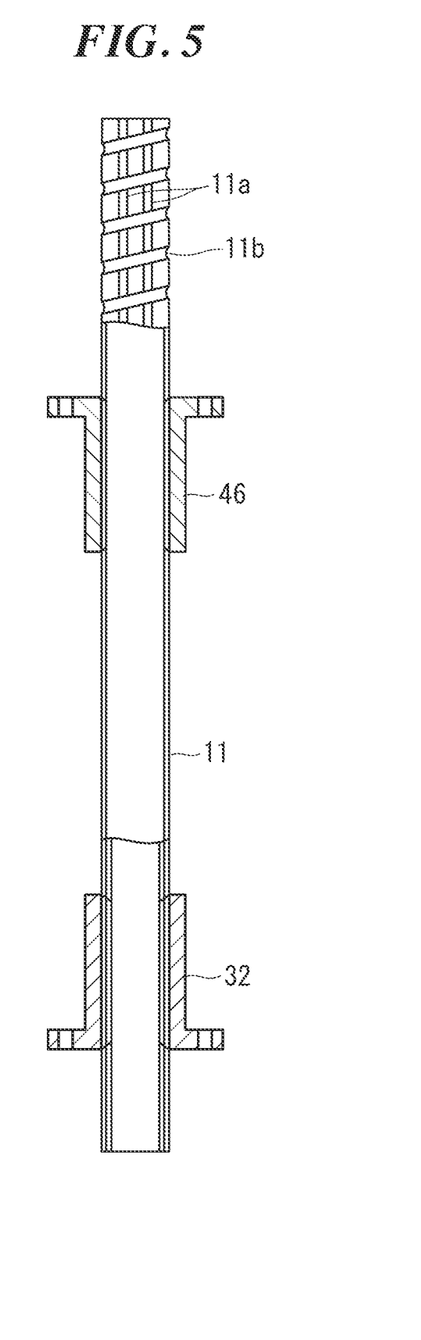
FIG. 5 is a cross-sectional view illustrating a spline nut and a trapezoidal thread nut, which are incorporated into the driver of the telescopic apparatus of the embodiment.

As illustrated in FIG. 5, instead of forming the key 22a1 on the driver 22a, a spline nut 46 may be secured to the driver 22a. The spline nut 46 fits in the axial groove (spline groove) 11a formed on the screw shaft 11 in such a manner as to be movable in the axial direction and unrotatable. The spline nut 46 is secured to an inner ring of a bearing 43 (refer to FIG. 2). A groove (trapezoidal thread) 11b is formed on the screw shaft 11. The nut (trapezoidal thread nut) 32 is threadedly engaged in the groove 11b.

Figure 6:
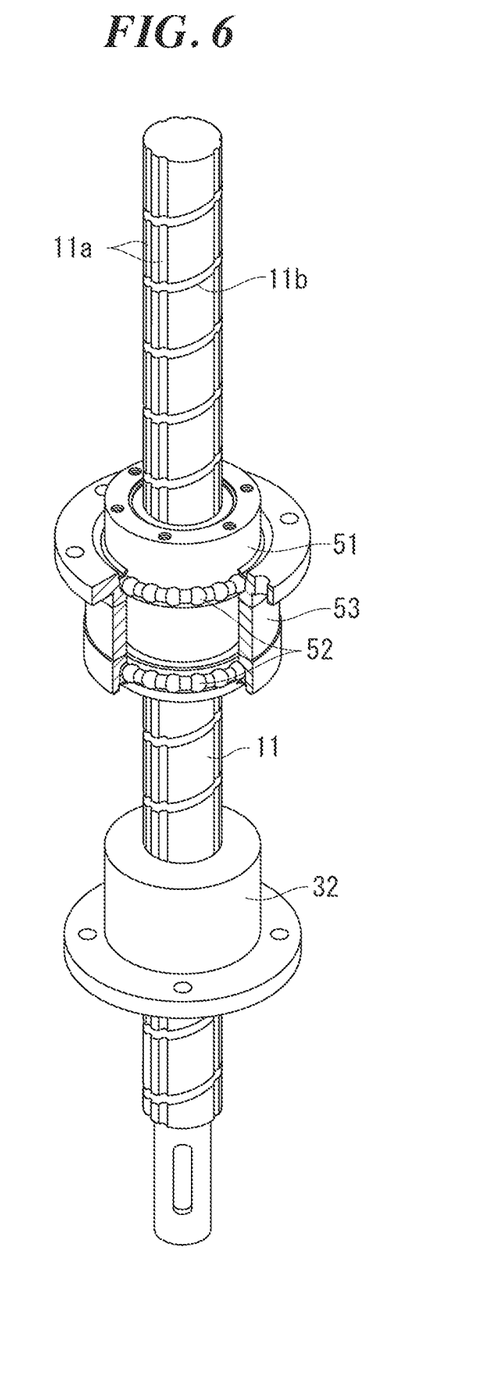
FIG. 6 is a perspective view illustrating a ball spline nut and a ball screw nut, which are incorporated into the driver of the telescopic apparatus of the embodiment.

As illustrated in FIG. 6, instead of securing the spline nut 46 to the driver 22a, a ball spline nut 51 may be secured to the driver 22a. The ball spline nut 51 fits in the axial groove (spline groove) 11a formed on the screw shaft 11 in such a manner as to be movable in the axial direction and unrotatable. The ball spline nut 51 includes, in an inner surface thereof, an axial groove (not illustrated) that faces the axial groove 11a of the screw shaft 11. The ball spline nut 51 is provided with a circulation path where a ball (not illustrated) that rolls between the axial groove 11a of the screw shaft 11 and the axial groove of the ball spline nut 51 circulates. The ball spline nut 51 of this example is rotatably coupled to the bottom plate 2a of the second pole 2 via a ball 52 and an outer ring 53. The groove (groove for a ball screw) 11b is formed on the screw shaft 11. The nut (ball screw nut) 32 is threadedly engaged in the groove 11b. The use of the ball spline nut 51 and the ball screw nut 32 allows the first to the third pole 1 to 3 to extend and contract smoothly.

Again, as illustrated in FIG. 2, the transmission 22, together with the second pole 2, can move in the axial direction relative to the screw shaft 11 of the first pole 1. A holder 44 that holds the bearing 43 is secured to the bottom plate 2a of the second pole 2. The driver 22a is secured to the inner ring of the bearing 43.

A second nut 33 (hereinafter referred to as the nut 33) that is threadedly engaged with the screw shaft 12 of the second pole 2 is mounted in the bottom plate 3a of the third pole 3. The nut 33 is, for example, a trapezoidal thread nut or a ball screw nut. When the screw shaft 12 is rotated, the third pole 3 secured to the nut 33 moves in the axial direction. Moreover, a through-hole 3a1 through which the screw shaft 11 of the first pole 1 penetrates is formed in the bottom plate 3a of the third pole 3 in the contracted state of the telescopic apparatus 10.

As illustrated in FIG. 3, when the motor 16 rotates the screw shaft 11 of the first pole 1, the second pole 2 secured to the nut 32 moves (ascends) in the axial direction. At the same time, the transmission 22, which moves (ascends) together with the second pole 2, rotates the screw shaft 12 of the second pole 2, and the third pole 3 secured to the nut 33 moves (ascends) in the axial direction. The second pole 2 and the third pole 3 ascend at one time. On the other hand, when the motor 16 rotates the screw shaft 11 of the first pole 1 in the opposite direction, the screw shaft 12 of the second pole 2 rotates in the opposite direction at the same time as the screw shaft 11, and the second pole 2 and the third pole 3 descend. In the contracted state illustrated in FIG. 2, at least part of the screw shaft 11 that is rotatably supported by the first pole 1, and at least part of the screw shaft 12 that is rotatably supported by the second pole 2 are inside the third pole 3.

Up to this point, the configuration of the telescopic apparatus of the embodiment has been described. The effects of the telescopic apparatus of the embodiment are as follows:

The first and second feed screws (the screw shafts 11 and 12, and the nuts 32 and 33) and the transmission 22 that can move in the axial direction are used to cause the first to the third pole 1 to 3 to extend and contract. Therefore, it is possible to cause the first to the third pole 1 to 3 to extend and contract smoothly without use of pneumatic pressure and hydraulic pressure.

The axial groove 11a is formed on the screw shaft 11 of the first pole 1. The key 22a1, the spline nut 46, or the ball spline nut 51 that fits in the axial groove 11a is provided to the driver 22a of the transmission 22. Therefore, the transmission 22 can be moved in the axial direction relative to the screw shaft 11 of the first pole 1.

The third pole 3 is provided with the bottom plate 3a where the nut 33 is mounted. The through-hole 3a1 through which the screw shaft 11 of the first pole 1 penetrates is formed in the bottom plate 3a. Therefore, interference between the bottom plate 3a and the screw shaft 11 can be prevented in the contracted state of the telescopic apparatus 10.

The at least part of the screw shaft 11 of the first pole 1, and the at least part of the screw shaft 12 of the second pole 2 are inside the third pole 3 in the contracted state illustrated in FIG. 2. Therefore, the telescopic apparatus 10 can be made compact. Moreover, it becomes easier to guide the movement of the third pole 3 by use of the second pole 2, and it becomes easier to guide the movement of the second pole 2 by use of the first pole 1. Furthermore, the force to cause the telescopic apparatus 10 to extend and contract can be focused near the center of the telescopic apparatus 10, and therefore the telescopic apparatus 10 extends and contracts smoothly. At least part of the screw shaft 11 or 12 may be configured to be inside the third pole 3.

The use of trapezoidal thread nuts as the nuts 32 and 33 enables self-locking. As a result, it is possible to prevent the first to the third pole 1 to 3 from extending and contracting under the weight of the object without providing a brake to the motor 16. Hence, the telescopic apparatus 10 can be used as a jack.

The use of ball screw nuts as the nuts 32 and 33 enables the telescopic apparatus 10 to operate smoothly.

Second Embodiment

FIGS. 7A to 7D illustrate a telescopic apparatus 60 of a second embodiment of the present invention. The telescopic apparatus 60 of the second embodiment is the four-stage telescopic apparatus 60. The telescopic apparatus 60 of the second embodiment includes a first to a fourth cylindrical member (hereinafter referred to as the first to the fourth pole 1 to 4) that are nested. The configurations of a base 17, a motor 16, and a transmission 20 are the same as those of the first embodiment. Therefore, the same reference numerals are assigned thereto, and descriptions thereof are omitted.

Figure 7A:
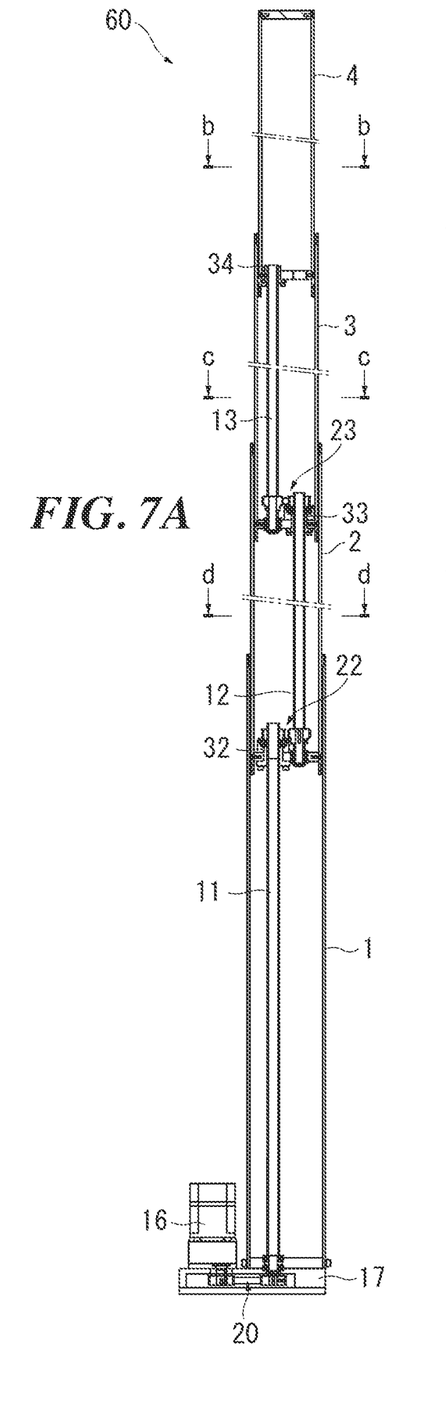
FIG. 7A is a vertical cross-sectional view of a telescopic apparatus (an extended state) of a second embodiment of the present invention.

Screw shafts 11 to 13 (hereinafter the third screw shaft 13 referred to as the screw shaft 13) are rotatably supported by the first to the third pole 1 to 3. An axial groove is formed on each of the screw shafts 11 and 12. An axial groove is not formed on the screw shaft 13.

Nuts 32 to 34 (hereinafter the third nut 34 referred to as the nut 34) are mounted in bottom plates 2a to 4a of the second to the fourth pole 2 to 4. The nuts 32 to 34 are threadedly engaged with the screw shafts 11 to 13 of the first to the third pole 1 to 3. Through-holes 4a1 and 4a2 through which the screw shaft 11 of the first pole 1 and the screw shaft 12 of the second pole 2 penetrate are formed in the bottom plate 4a of the fourth pole 4 in a contracted state of the telescopic apparatus 60. A through-hole 3a1 through which the screw shaft 11 of the first pole 1 penetrates is formed in the bottom plate 3a of the third pole 3.

The second pole 2 is provided with a transmission 22 that transmits the rotation of the screw shaft 11 of the first pole 1 to the screw shaft 12 of the second pole 2. The transmission 22 can move in an axial direction relative to the screw shaft 11 of the first pole 1. The third pole 3 is provided with a second transmission 23 (hereinafter referred to as the transmission 23) that transmits the rotation of the screw shaft 12 of the second pole 2 to the screw shaft 13 of the third pole 3. The transmission 23 can move in the axial direction relative to the screw shaft 12 of the second pole 2. The configurations of the transmissions 22 and 23 are the same as the transmission 22 of the first embodiment.

When the motor 16 rotates the screw shaft 11 of the first pole 1, the transmissions 22 and 23 rotate the screw shafts 11 to 13 at one time. The screw shafts 11 to 13 rotate at one time to cause the first to the fourth pole 1 to 4 to extend and contract. At least part of the screw shafts 11 to 13 are inside the fourth pole 4 in the contracted state of the telescopic apparatus 60.

Figure 7B:
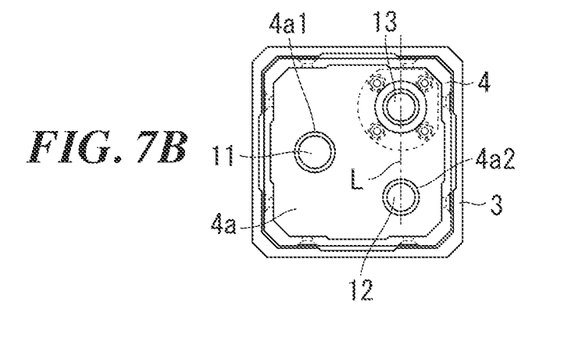
FIG. 7B is a cross-sectional view taken along line b-b in FIG. 7A.
Figure 7C:
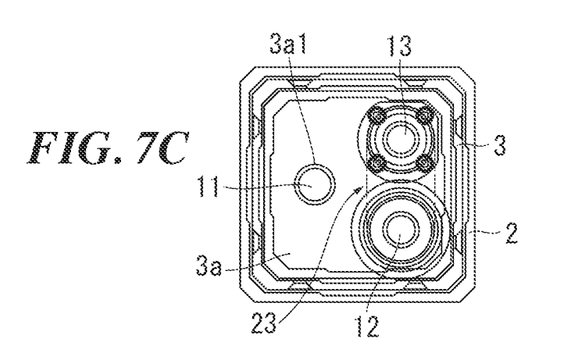
FIG. 7C is a cross-sectional view taken along line c-c in FIG. 7A.
Figure 7D:
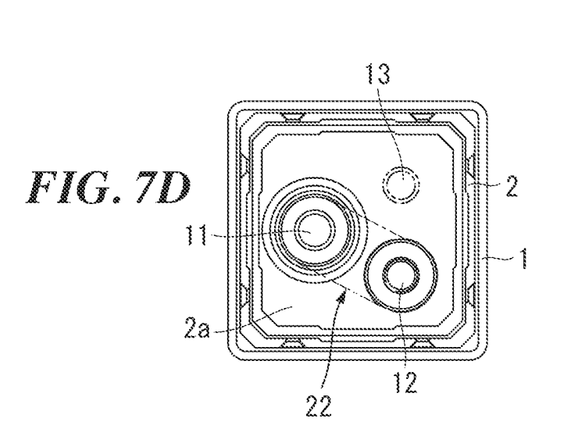
FIG. 7D is a cross-sectional view taken along line d-d in FIG. 7A.

As illustrated in FIGS. 7B to 7D, each of the first to fourth pole 1 to 4 is formed into an approximately square shape in cross section. As illustrated in FIG. 7B, the screw shafts 12 and 13 are placed at corners of the square fourth pole 4 in axial view. Moreover, the remaining screw shaft 11 is placed at a position offset from a line L linking the screw shafts 12 and 13. The screw shafts 11 to 13 are placed in this manner; therefore, it is possible to prevent the screw shafts 11 to 13 from coinciding when the first to the fourth pole 1 to 4 contract.

Third Embodiment

FIGS. 8A to 8E illustrate a telescopic apparatus 70 of a third embodiment of the present invention. The telescopic apparatus 70 of the third embodiment is the five-stage telescopic apparatus 70. The telescopic apparatus 70 of the third embodiment includes a first to a fifth cylindrical member (hereinafter referred to as the first to the fifth pole 1 to 5) that are nested. The configurations of a base 17, a motor 16, and a transmission 20 are the same as those of the first embodiment. Therefore, the same reference numerals are assigned thereto, and descriptions thereof are omitted.

Figure 8A:
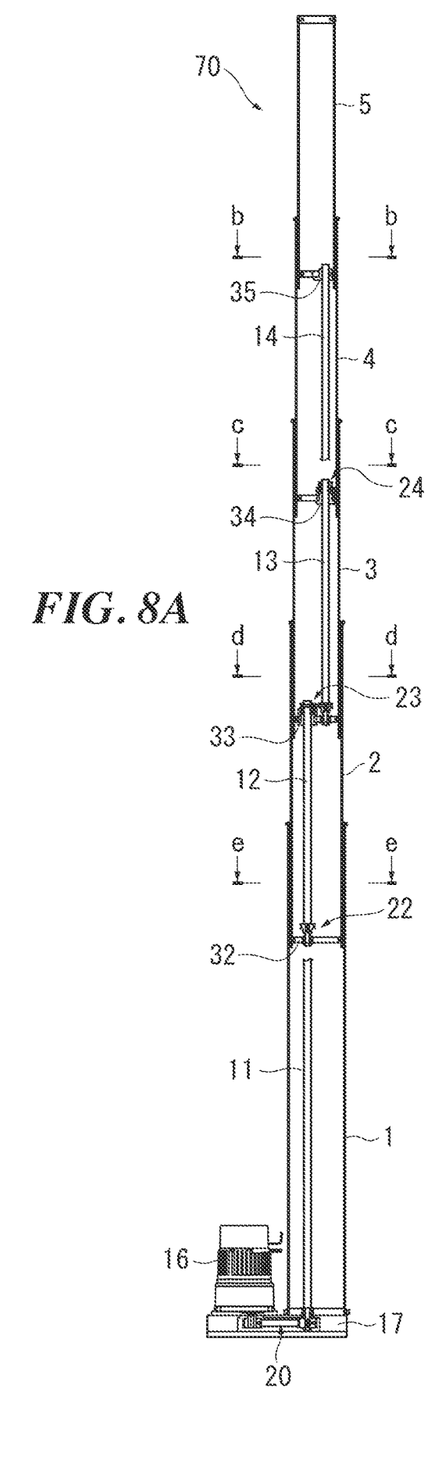
FIG. 8A is a vertical cross-sectional view of a telescopic apparatus (an extended state) of a third embodiment of the present invention.

Screw shafts 11 to 14 (hereinafter the fourth screw shaft 14 referred to as the screw shaft 14) are rotatably supported by the first to the fourth pole 1 to 4. An axial groove is formed on each of the screw shafts 11 to 13. An axial groove is not formed on the screw shaft 14.

Nuts 32 to 35 (hereinafter the fourth nut 35 referred to as the nut 35) are mounted in bottom plates 2a to 5a of the second to the fifth pole 2 to 5. The nuts 32 to 35 are threadedly engaged with the screw shafts 11 to 14 of the first to the fourth pole 1 to 4.

The second pole 2 is provided with a transmission 22 that transmits the rotation of the screw shaft 11 of the first pole 1 to the screw shaft 12 of the second pole 2. The transmission 22 can move in an axial direction relative to the screw shaft 11 of the first pole 1. The third pole 3 is provided with a transmission 23 that transmits the rotation of the screw shaft 12 of the second pole 2 to the screw shaft 13 of the third pole 3. The transmission 23 can move in the axial direction relative to the screw shaft 12 of the second pole 2. The fourth pole 4 is provided with a third transmission 24 (hereinafter referred to as the transmission 24) that transmits the rotation of the screw shaft 13 of the third pole 3 to the screw shaft 14 of the fourth pole 4. The transmission 24 can move in the axial direction relative to the screw shaft 13 of the third pole 3. The configurations of the transmissions 22 to 24 are the same as the transmission 22 of the first embodiment.

When the motor 16 rotates the screw shaft 11 of the first pole 1, the transmissions 22 to 24 rotate the screw shafts 11 to 14 at one time. The screw shafts 11 to 14 rotate at one time to cause the first to the fifth pole 1 to 5 to extend and contract. At least part of the screw shafts 11 to 14 are inside the fifth pole 5 in the contracted state of the telescopic apparatus 70.

Figure 8B:
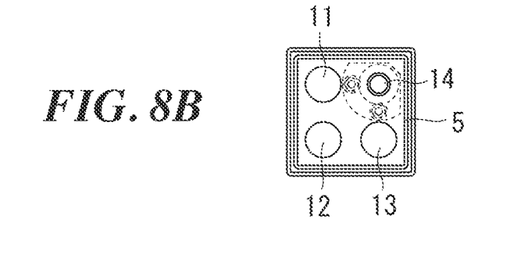
FIG. 8B is a cross-sectional view taken along line b-b in FIG. 8A.
Figure 8C:
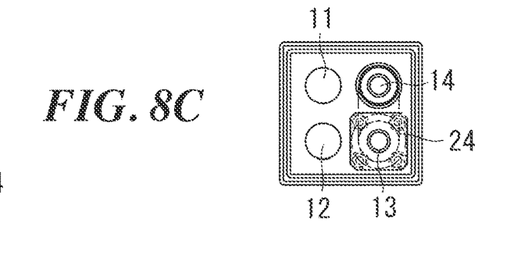
FIG. 8C is a cross-sectional view taken along line c-c in FIG. 8A.
Figure 8D:
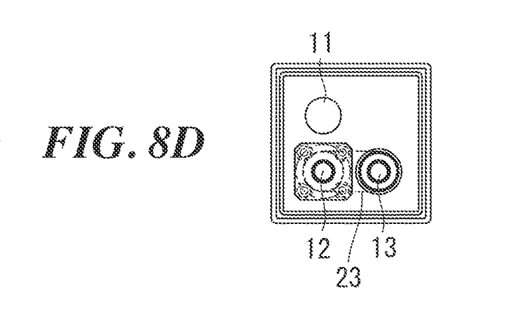
FIG. 8D is a cross-sectional view taken along line d-d in FIG. 8A.
Figure 8E:
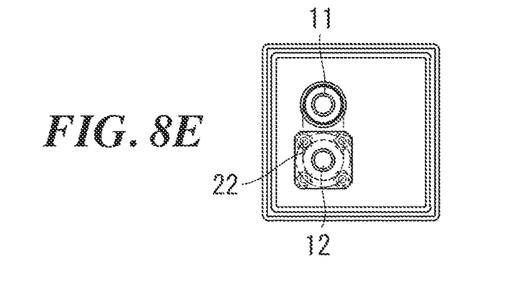
FIG. 8E is a cross-sectional view taken along line e-e in FIG. 8A.

As illustrated in FIGS. 8B to 8E, each of the first to the fifth pole 1 to 5 is formed into an approximately square shape in cross section. As illustrated in FIG. 8B, the screw shafts 13 and 14 are placed at corners of the fifth pole 5 in axial view. Moreover, the remaining screw shafts 11 and 12 are placed at the remaining corners of the fifth pole 5. The screw shafts 11 to 14 are placed in this manner; therefore, it is possible to prevent the screw shafts 11 to 14 from coinciding when the first to the fifth pole 1 to 5 contract.

Fourth Embodiment

FIGS. 9A to 9F illustrate a telescopic apparatus 80 of a fourth embodiment of the present invention. The telescopic apparatus 80 of the fourth embodiment is the six-stage telescopic apparatus 80. The telescopic apparatus 80 of the fourth embodiment includes a first to a sixth cylindrical member (hereinafter referred to as the first to the sixth pole 1 to 6) that are nested. The configurations of a base 17, a motor 16, and a transmission 20 are the same as those of the first embodiment. Therefore, the same reference numerals are assigned thereto, and descriptions thereof are omitted.

Figure 9A:
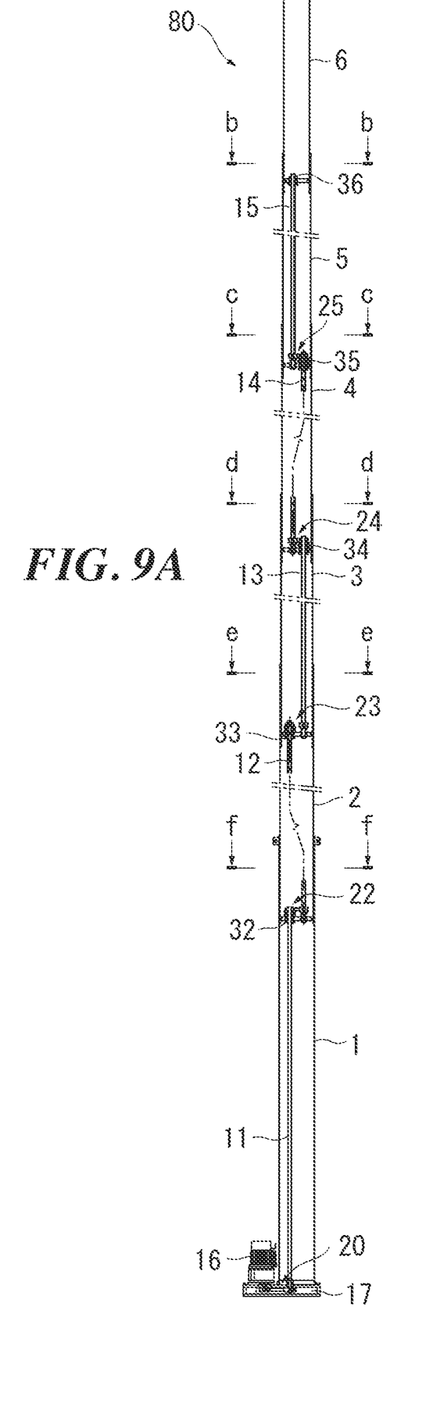
FIG. 9A is a vertical cross-sectional view of a telescopic apparatus (an extended state) of a fourth embodiment of the present invention.

Screw shafts 11 to 15 (hereinafter the fifth screw shaft 15 referred to as the screw shaft 15) are rotatably supported by the first to the fifth pole 1 to 5. An axial groove is formed on each of the screw shafts 11 to 14. An axial groove is not formed on the screw shaft 15.

Nuts 32 to 36 (hereinafter the fifth nut 36 referred to as the nut 36) are mounted in bottom plates 2a to 6a of the second to the sixth pole 2 to 6. The nuts 32 to 36 are threadedly engaged with the screw shafts 11 to 15 of the first to the fifth pole 1 to 5.

The second pole 2 is provided with a transmission 22 that transmits the rotation of the screw shaft 11 of the first pole 1 to the screw shaft 12 of the second pole 2. The transmission 22 can move in an axial direction relative to the screw shaft 11 of the first pole 1. The third pole 3 is provided with a transmission 23 that transmits the rotation of the screw shaft 12 of the second pole 2 to the screw shaft 13 of the third pole 3. The transmission 23 can move in the axial direction relative to the screw shaft 12 of the second pole 2. The fourth pole 4 is provided with a transmission 24 that transmits the rotation of the screw shaft 13 of the third pole 3 to the screw shaft 14 of the fourth pole 4. The transmission 24 can move in the axial direction relative to the screw shaft 13 of the third pole 3. The fifth pole 5 is provided with a fourth transmission 25 thereinafter referred to as the transmission 25) that transmits the rotation of the screw shaft 14 of the fourth pole 4 to the screw shaft 15 of the fifth pole 5. The transmission 25 can move in the axial direction relative to the screw shaft 14 of the fourth pole 4. The configurations of the transmissions 22 to 25 are the same as the transmission 22 of the first embodiment.

When the motor 16 rotates the screw shaft 11 of the first pole 1, the transmissions 22 to 25 rotate the screw shafts 11 to 15 at one time. The screw shafts 11 to 15 rotate at one time to cause the first to the sixth pole 1 to 6 to extend and contract. At least part of the screw shafts 11 to 15 are inside the sixth pole 6 in the contracted state of the telescopic apparatus 80.

Figure 9B:
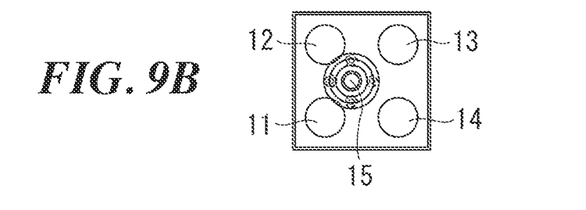
FIG. 9B is a cross-sectional view taken along line b-b in FIG. 9A.
Figure 9C:
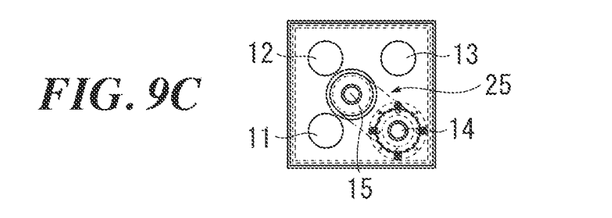
FIG. 9C is a cross-sectional view taken along line c-c in FIG. 9A.
Figure 9D:
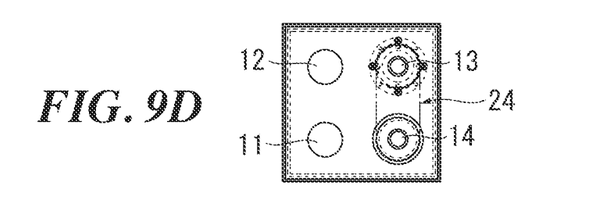
FIG. 9D is a cross-sectional view taken along line d-d in FIG. 9A.
Figure 9E:
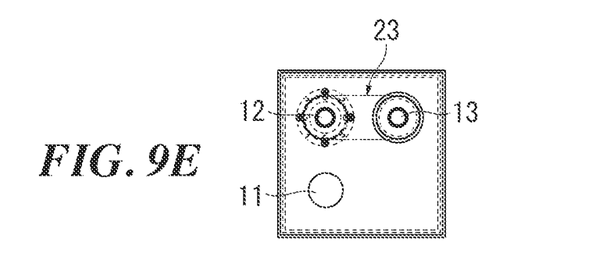
FIG. 9E is a cross-sectional view taken along line e-e in FIG. 9A.
Figure 9F:
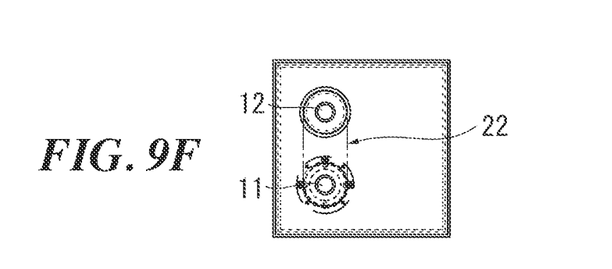
FIG. 9F is a cross-sectional view taken along line f-f in FIG. 9A.

As illustrated in FIGS. 9B to 9F, each of the first to the sixth pole 1 to 6 is formed into an approximately square shape in cross section. As illustrated in FIG. 9B, the screw shafts 13 and 14 are placed at corners of the sixth pole 6 in axial view. Moreover, the remaining screw shafts 11 and 12 are placed at the remaining corners of the sixth pole 6. The remaining screw shaft 15 is placed substantially in the center of the sixth pole 6. The screw shafts 11 to 15 are placed in this manner; therefore, it is possible to prevent the screw shafts 11 to 15 from coinciding when the first to the sixth pole 1 to 6 contract.

(Transfer Apparatus)

Figure 10:
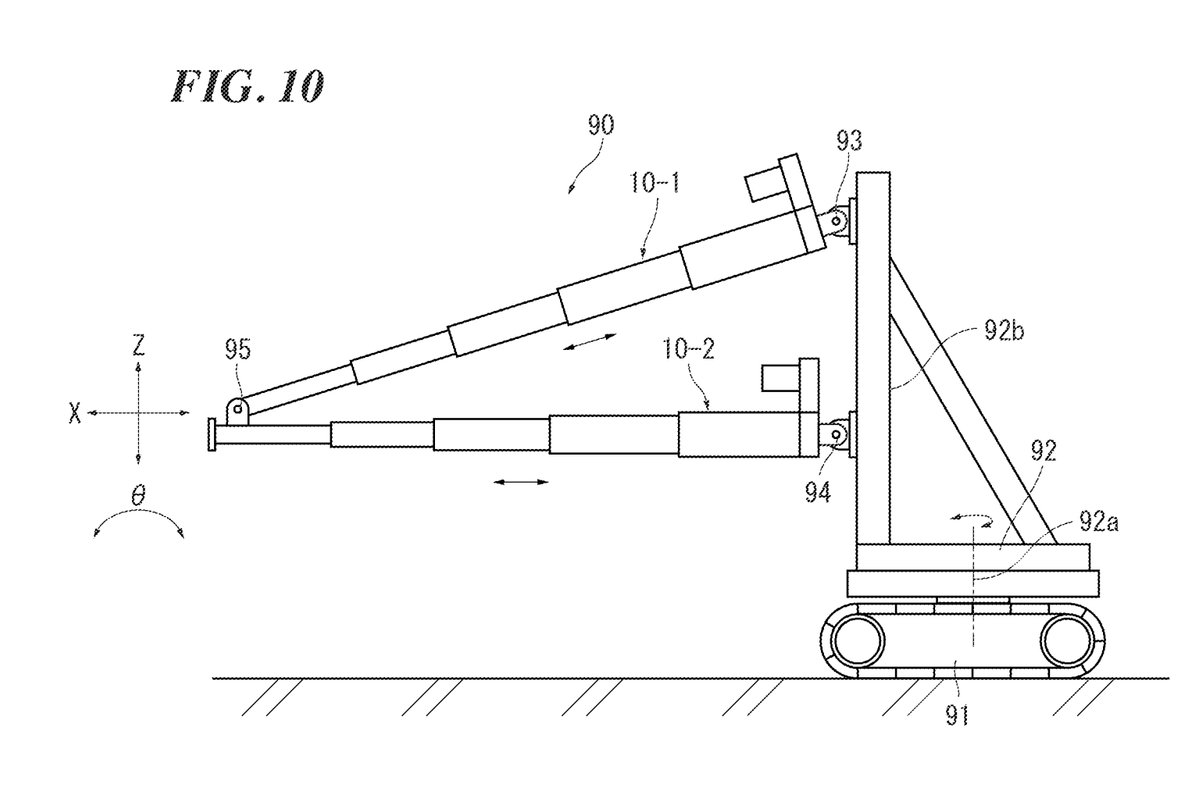
FIG. 10 is a diagram illustrating an example where the telescopic apparatuses of the embodiments are applied to a transfer apparatus.

FIG. 10 illustrates an example where the telescopic apparatuses 10, 60, 70, and 80 (hereinafter simply referred to as the telescopic apparatuses 10-1 and 10-2) of the embodiments are applied to a transfer apparatus 90. The transfer apparatus includes the upper first telescopic apparatus 10-1 and the lower second telescopic apparatus 10-2. A base 92 is secured on a caterpillar 91 or a wheel. The base 92 can rotate about a vertical axis 92a relative to the caterpillar 91.

A proximal end of the first telescopic apparatus 10-1 is coupled to a vertical plate 92b of the base 92 in such a manner as to be turnable on a pivot 93. Moreover, a proximal end of the second telescopic apparatus 10-2 is coupled to the vertical plate 92b of the base 92 in such a manner as to be turnable on a pivot 94. A distal end of the first telescopic apparatus 10-1 and a distal end of the second telescopic apparatus 10-2 are coupled together in such a manner as to be turnable on a pivot 95. The first telescopic apparatus 10-1 and the second telescopic apparatus 10-2 intersect at an acute angle (for example, 30°).

An object such as a tool is mounted on the distal end of the first telescopic apparatus 10-1 or the second telescopic apparatus 10-2. The extension and contraction of the first telescopic apparatus 10-1 and the second telescopic apparatus allows the object to move in an X direction (horizontal direction) and/or a Z direction (vertical direction). Moreover, the rotation of the base 92 about the vertical axis 92a allows the object to turn in a horizontal plane. Hence, the object can be moved three-dimensionally.

(Parallel Link Robot)

Figure 11:
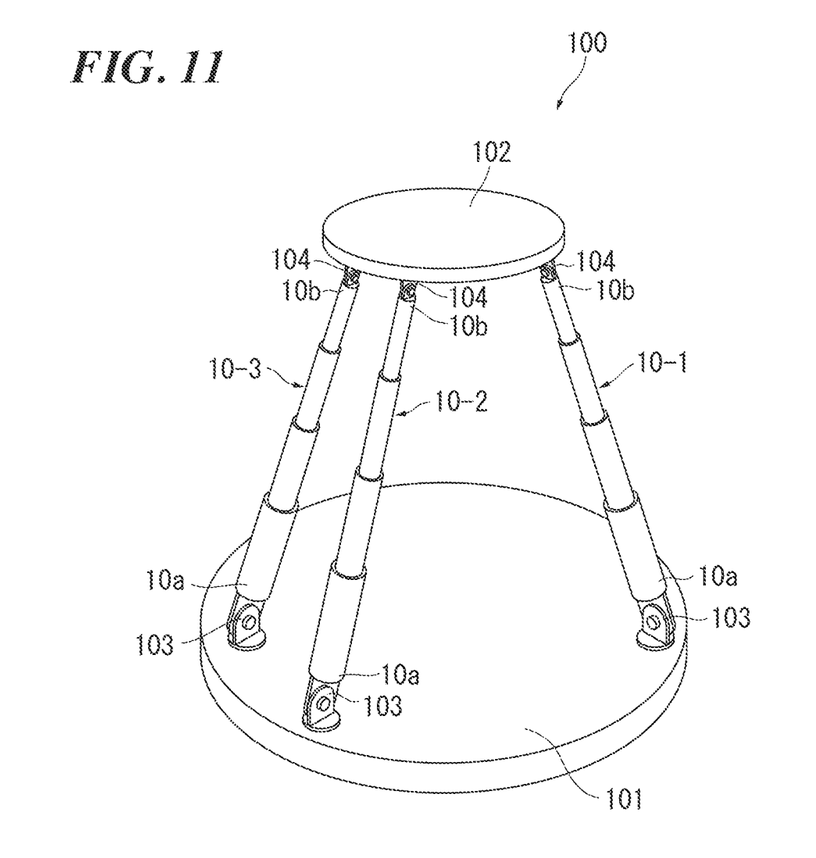
FIG. 11 is a diagram illustrating an example where the telescopic apparatuses of the embodiments are applied to a parallel link robot.

FIG. 11 illustrates an example where the telescopic apparatuses 10, 60, 70, and 80 (hereinafter simply referred to as the telescopic apparatuses 10-1, 10-2, and 10-3) of the embodiments are applied to a parallel link robot 100. The parallel link robot 100 includes a base 101, the first telescopic apparatus 10-1, the second telescopic apparatus 10-2, the third telescopic apparatus 10-3, and a movable unit 102.

One ends 10a of the first telescopic apparatus 10-1, the second telescopic apparatus 10-2, and the third telescopic apparatus 10-3 are coupled to the base 101 via joints 103 such as single-axis hinges, universal joints, or spherical joints in such a manner as to be rockable. The other ends 10b of the first telescopic apparatus 10-1, the second telescopic apparatus 10-2, and the third telescopic apparatus 10-3 are coupled to the movable unit 102 via joints 104 such as single-axis hinges, universal joints, or spherical joints in such a manner as to be rockable. A moving target such as a hand, a tool, a measuring instrument, or a camera is placed on the movable unit 102. When the first telescopic apparatus 10-1, the second telescopic apparatus 10-2, and the third telescopic apparatus 10-3 are caused to extend and contract, the movable unit 102 can be moved, and/or the attitude of the movable unit 102 can be changed.

The parallel link robot 100 of the embodiment exerts the following effects: the strokes of the first telescopic apparatus 10-1, the second telescopic apparatus 10-2, and the third telescopic apparatus 10-3 can be increased, and therefore the range of movement of the movable unit 102 can be increased. For example, the movable unit 102 can also become fully horizontal.

The large parallel link robot 100 can be realized (for example, the stroke of the movable unit 102 can be increased, or a load acting on the movable unit 102 can be increased).

It is possible to encourage making each of the telescopic apparatuses 10-1, 10-2, and 10-3 compact. Therefore, even if the size of the parallel link robot 100 is increased, the well-fitted parallel link robot 100 can be obtained.

The parallel link robot 100 may be placed vertically or horizontally, or may be suspended from the ceiling. The number of the telescopic apparatuses 10-1, 10-2, and 10-3 can also be four or more, for example, six.

The present invention is not limited to the realization of the above embodiments, and can be modified into other embodiments within a scope where the gist of the present invention is not changed.

In the first to the fourth embodiment, the first pole of the telescopic apparatus is placed at the bottom, and the n-th (n≥3) pole at the top. However, the telescopic apparatus may be configured in such a manner as to be turned upside down and lift an object. Moreover, the telescopic apparatus may be placed horizontally, and extend and contract horizontally.

In the first to the fourth embodiment, the examples of the three- to six-stage telescopic apparatuses have been described. However, the telescopic apparatus can be configured in such a manner as to have seven or more stages according to the requested lengths of extension and contraction.

What is claimed is:

1. A telescopic apparatus comprising:
   a first, second and third cylindrical member that are nested;
   a first screw shaft supported rotatably by the first cylindrical member;
   a second screw shaft supported rotatably by the second cylindrical member;
   a first nut mounted on the second cylindrical member to be threadedly engaged with the first screw shaft;
   a second nut mounted on the third cylindrical member to be threadedly engaged with the second screw shaft;
   a motor configured to rotationally drive the first screw shaft; and
   a first transmission configured to transmit the rotation of the first screw shaft to the second screw shaft of each and to be movable in an axial direction relative to the first screw shaft, wherein
   the first and second screw shafts rotate at one time to cause the first, second and third cylindrical member to extend and contract,
   a helical groove is formed in an outer surface of the first screw shaft, and an axial groove intersecting the groove is formed in the outer surface of the first screw shaft,
   a driver of the first transmission is provided with a key, a spline nut, or a ball spline nut that fits in the axial groove, and
   at least part of the first screw shaft and at least part of the second screw shaft are inside the first, second and third cylindrical member in a contracted state of the telescopic apparatus, and the motor is outside the first, second and third cylindrical member.

2. The telescopic apparatus according to claim 1, wherein the third cylindrical member is provided with a bottom plate where the second nut of the third cylindrical member is mounted, and the bottom plate includes a through-hole(s) each formed to allow the first screw shaft to penetrate therethrough in a contracted state of the telescopic apparatus.

3. The telescopic apparatus according to claim 1, wherein the first and second nuts are trapezoidal thread nuts or ball screw nuts.

4. The telescopic apparatus according to claim 1, wherein the telescopic apparatus further comprises:
- a fourth cylindrical member that is nested with the third cylindrical member;
- a third screw shaft that is rotatably supported by the third cylindrical member;
- a third nut mounted on the fourth cylindrical member to be threadedly engaged with the third screw shaft; and
- a second transmission configured to transmit the rotation of the second screw shaft to the third screw shaft and to be movable in an axial direction relative to the second screw shaft, each of the first, second, third and fourth cylindrical member is formed into an approximately square shape in cross section, and in axial view, two screw shafts out of the first, second and third screw shafts are placed at corners of the fourth cylindrical member, and remaining screw shafts out of the first, second and third screw shafts are placed at a position offset from a line linking the two screw shafts.

5. The telescopic apparatus according to claim 1, wherein the telescopic apparatus further comprises:
- a fourth cylindrical member that is nested with the third cylindrical member;
- a fifth cylindrical member that is nested with the fourth cylindrical member;
- a third screw shaft that is rotatably supported by the third cylindrical member;
- a fourth screw shaft that is rotatably supported by the fourth cylindrical member;
- a third nut mounted on the fourth cylindrical member to be threadedly engaged with the third screw shaft;
- a fourth nut mounted on the fifth cylindrical member to be threadedly engaged with the fourth screw shaft;
- a second transmission configured to transmit the rotation of the second screw shaft to the third screw shaft and to be movable in an axial direction relative to the second screw shaft; and
- a third transmission configured to transmit the rotation of the third screw shaft to the fourth screw shaft and to be movable in an axial direction relative to the third screw shaft, each of the first to the fifth cylindrical member is formed into an approximately square shape in cross section, and in axial view, the first, second, third and fourth screw shafts are placed at corners of the fifth cylindrical member.

6. A transfer apparatus comprising:
- a first telescopic apparatus and a second telescopic apparatus according to claim 1; and
- a base coupled to a proximal end of the first telescopic apparatus in such a manner as to be turnable on a pivot, the base being coupled to a proximal end of the second telescopic apparatus in such a manner as to be turnable on a pivot, wherein
- a distal end of the first telescopic apparatus and a distal end of the second telescopic apparatus are coupled together in such a manner as to be turnable on a pivot.

7. A parallel link robot comprising:
- a first telescopic apparatus, a second telescopic apparatus and a third telescopic apparatus according to claim 1;
- a base coupled to one ends of the first to the third telescopic apparatus; and
- a movable unit coupled to the other ends of the first to the third telescopic apparatus.

\* \* \* \* \*